United States Patent [19]
Ratschmeier et al.
[11] 3,848,167
[45] Nov. 12, 1974

[54] ARRANGEMENT FOR GENERATING A CLOCK FREQUENCY SIGNAL FOR RECORDING INFORMATION ON A DATA CARRIER

[75] Inventors: Dieter Ratschmeier, Schwaig; Reinhard Stark; Jürgen Wenk, both of Nurnberg, all of Germany

[73] Assignee: Siemens Aktiengesellschaft, Munich, Germany

[22] Filed: June 27, 1972

[21] Appl. No.: 266,642

[30] Foreign Application Priority Data

July 1, 1971 Germany ............................ 2132783

[52] U.S. Cl. .......... 318/254, 340/174.1 A, 307/106, 328/61

[51] Int. Cl. .......................... G11b 5/00, H03k 3/69

[58] Field of Search ............................... 328/61–63; 307/106, 309; 318/138, 254, 327; 340/174.1 A

[56] References Cited

UNITED STATES PATENTS

| | | | |
|---|---|---|---|
| 3,517,289 | 6/1970 | Brunner | 318/254 |
| 3,576,584 | 4/1971 | Cone | 340/174.1 A |
| 3,688,133 | 8/1972 | Flachsbarth | 307/309 |
| 3,754,175 | 8/1973 | Girault | 318/327 |

*Primary Examiner*—David Smith, Jr.
*Assistant Examiner*—Thomas Langer
*Attorney, Agent, or Firm*—Kenyon & Kenyon Reilly Carr & Chapin

[57] ABSTRACT

An arrangement for generating a clock frequency signal for recording digital information on a data carrier such as a magnetic tape or the like is disclosed. The data carrier is driven by a brushless direct-current drive motor having a permanent magnet rotor, a stator winding and an electronic circuit for inducing voltages in the stator winding in dependence upon the changing position of the rotor to produce a rotating stator field. The arrangement includes a monitoring transmission circuit connected to the electronic circuit for providing a first signal varying in correspondence to the rotating stator field and a signal conversion circuit connected to the monitoring circuit for converting the first signal into a periodic waveform synchronized to the speed of rotation of the rotor. The waveform alternately assumes one of two values and the time of transition between these values is negligible.

4 Claims, 3 Drawing Figures

ARRANGEMENT FOR GENERATING A CLOCK FREQUENCY SIGNAL FOR RECORDING INFORMATION ON A DATA CARRIER

BACKGROUND OF THE INVENTION

The invention relates to an arrangement for generating the clock frequency for recording digital information on a data carrier such as a magnetic tape or the like.

Recording digital information on a magnetic tape or a similar data carrier requires that the information signals be written in a definite and constant pattern. This requires great stability of the tape speed as well as of the frequency of the recording clock. It is known to synchronize the recording clock frequency directly with the speed of the drive shaft by arranging the drive shaft to drive a pattern disc which is optically scanned to derive the recording clock frequency. Such arrangements, however, are costly.

SUMMARY OF THE INVENTION

It is an object of the invention to provide an arrangement for generating a clock frequency wherein a rigid coupling is achieved between the clock frequency used in recording and the speed of the data carrier. Subsidiary to this object, it is an object of the invention to provide such an arrangement which utilizes the rotor position of the motor driving the data carrier.

It is another object to provide an arrangement for generating a clock frequency that can be produced at a cost lower than the prior art arrangements already described.

A data carrier such as a magnetic tape or the like upon which it is desired to record digital information is driven by a brushless direct-current drive motor having a permanent magnet rotor, a stator winding and an electronic circuit for inducing voltages in the stator winding in dependence upon the changing position of the rotor to produce a rotating stator field. A clock frequency for recording digital information on the carrier is obtained with the arrangement of the invention which utilizes a signal indicative of changing rotor position. According to a feature of the invention, the arrangement includes monitoring means for monitoring the electronic circuit of the rushless directcurrent motor that drives the data carrier to obtain a first signal varying in correspondence to the rotating stator field. Also provided are signal conversion means connected to the monitoring means for converting the first signal into a periodic waveform synchronized to the speed of rotation of the rotor. The waveform thus obtained alternately assumes one of two values, the time of transition between these values being negligible.

According to one embodiment of the invention, the monitoring means can be in the form of transmission circuits connected to the outputs of the transmitting detectors of the electronic circuit which are disposed in the field of the permanent magnet rotor and provide respective first signals indicative of the changing position of the rotor. The signal conversion means includes comparators for converting the first signals into respective second signals of rectangular waveform. The comparators are connected to corresponding ones of the detectors through respective ones of the transmission circuits. An exclusive-OR circuit having a plurality of inputs receives the second signals respectively for forming therefrom the periodic waveform synchronized to the speed of rotation of the rotor.

A substantial savings in cost is realized when using brushless direct-current motors as drive motors for the data carrier if the position transmitting detectors of the motor are utilized to generate the synchronized clock frequency.

The rotor position of brushless direct-current motors can be determined galvanomagnetically, inductively, photoelectrically or in some other similar way. The rotor position transmitting detectors cause voltage to be developed across the component windings of the motor associated therewith in such a manner that a rotating stator field is produced; this field coacts with a permanent magnet rotor to develop the motor torque. The rotor position transmitting detectors therefore deliver constant n pulses per rotor revolution which can be utilized to obtain a rigid coupling between the tape speed and the recording clock frequency.

The signal spacing on the data carrier then depends only on the reduction ratio between the motor and the tape drive shaft. A change in the motor speed has no influence on the accuracy of the recording pattern, so that recording is possible also during the time that the motor starts up.

According to an alternate embodiment, the arrangement for generating a clock frequency has monitoring means in the form of signal transmission circuits connected to the respective component windings of the drive motor stator winding. The conversion means here too includes comparators for converting the first signals into respective second signals of rectangular waveform. The comparators are, however, connected to corresponding ones of the component windings through respective ones of the transmission circuits. As in the first embodiment, an exclusive-OR circuit forms the periodic waveform synchronized to the speed of rotation of the rotor. As a subsidiary feature of the alternate embodiment, the signal transmission circuits can each contain a diode for coupling out the corresponding emf voltage induced in the corresponding component stator winding.

Although the invention is illustrated and described herein as an arrangement for generating a clock frequency signal for recording information on a data carrier, it is nevertheless not intended to be limited to the details shown, since various modifications may be made therein within the scope and the range of the claims. The invention, however, together with additional objects and advantages will be best understood from the following description and in connection with the accompanying drawings.

DESCRIPTION OF THE PREFERRED EMBODIMENTS

Figure 1:
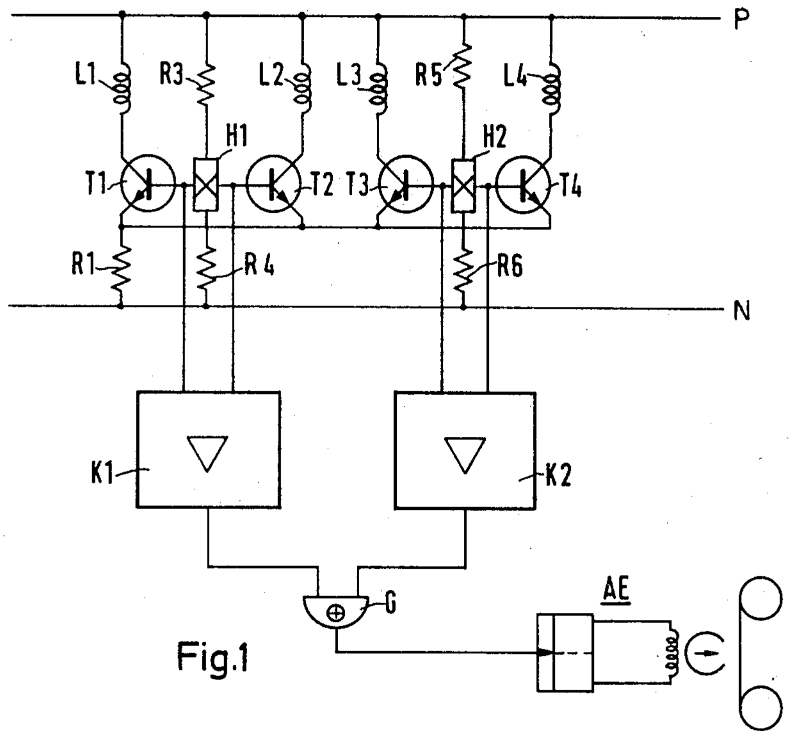
FIG. 1 is a schematic diagram of an arrangement for generating a synchronized clock frequency according to the invention wherein the position of the rotor of the brushless directcurrent motor is monitored at the output of Hall-Effect generators.

Referring to FIG. 1, the stator windings of a brushless direct-current motor of conventional construction are designated with L1 to L4. One end of each winding is connected directly to the line N of a direct-current source whereas the other end of each winding L1 to L4 is connected through respective transistors T1 to T4 and a common resistor R1 to the other terminal of the voltage source. The respective transistor pairs T1, T2 and T3, T4 are cyclically driven by means of rotor position transmitting detectors. In the embodiment of FIG. 1, Hall-Effect generators H1 and H2 are used as rotor position transmitting detectors. The control electrodes of the Hall-Effect generators are connected through respective resistor sets R3, R4 and R5, R6 to the voltage source. On the other hand, the Hall electrodes of the Hall-Effect generator H1 are connected to respective base electrodes of the transistors of transistor pair T1, T2. Similarly, the Hall electrodes of Hall-Effect generator H2 are connected to respective base electrodes of the transistor pair T3, T4. The Hall-Effect generators are excited by a permanent magnet rotor, not shown in the drawing, in such a manner that the stator field leads the rotor field by approximately 90°.

Figure 2:
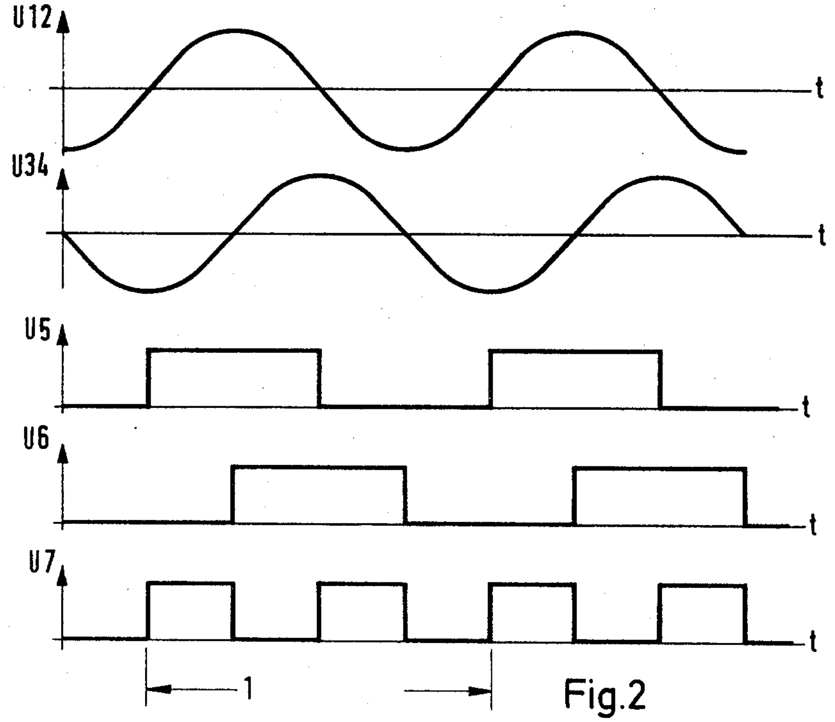
FIG. 2 illustrates the waveforms obtaining at respective locations in the circuit arrangement of FIG. 1.

The voltages U12 and U34 delivered by the Hall-Effect generators are shown in FIG. 2, by the first and second waveforms. Because the two Hall-Effect generators are spatially displaced by 90° with respect to each other, the Hall voltages U12 and U34 are also displaced with respect to each other by 90°.

According to the invention, the recording clock frequency is derived from the rotor position of the drive motor. For this purpose, the Hall voltages U12 and U34 of the Hall-Effect generators are fed to comparators K1 and K2 which convert the Hall voltages into square-wave voltages U5 and U6. These square-wave voltages are shown in FIG. 2 by the third and fourth waveforms and are fed to an exclusive OR gate G.

A voltage U7 is obtained at the output of the exclusive OR gate; this voltage U7 is obtained from the combination of the voltages U5 and U6 and is shown as the last waveform in FIG. 2. One revolution of the rotor provides four signal transisitions. With this signal, the recording circuit symbolized by AE can be synchronized as indicated in FIG. 1.

As explained above, four signal transitions per revolution are obtained with the circuit described; this is the maximum possible pulse frequency. So that the spacings of the signal changes within a revolution become equal, it is necessary to make the voltages symmetrical by appropriate circuits. These difficulties are obviated if the number of signal changes per revolution are limited to two or only to one.

Figure 3:
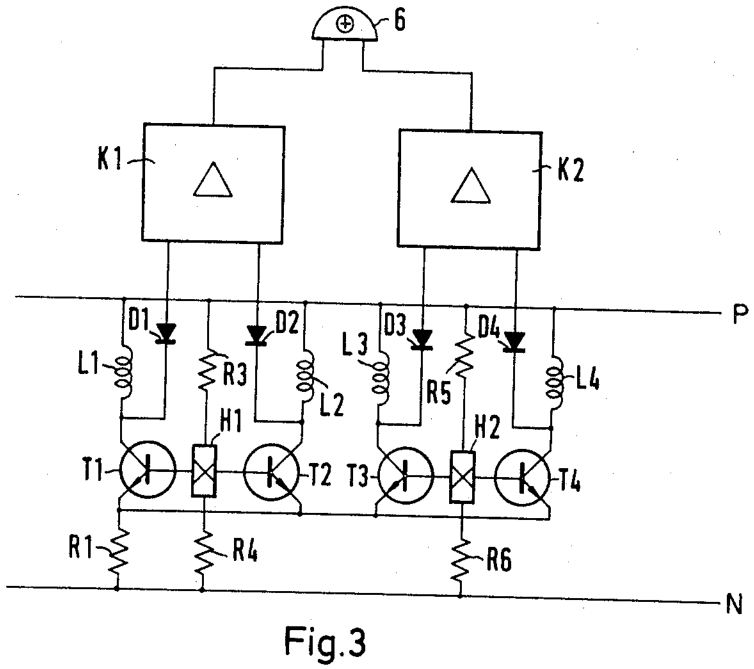
FIG. 3 is a schematic diagram of an alternate embodiment of the invention wherein the rotor position is monitored at the component windings which make up the stator winding of the brushless direct-current drive motor.

According to an alternate embodiment of the invention, the clock frequency from the motor speed is obtained by monitoring the electromotive force (emf) induced in the stator windings L1 to L4 in lieu of using the drive signals for the transistors T1 to T4. As shown in FIG. 3, this emf is coupled from the stator windings L1 to L4 by means of diodes D1 to D4. The emf can be evaluated, as in the embodiment according to FIG. 1 by means of comparators K1 and K2 and the gate G, whereby the same pulse frequency is obtained.

What is claimed is:

1. Arrangement for generating a clock frequency signal for recording digital information on a data carrier such as a magnetic tape or the like driven by a brushless direct-current drive motor having a permanent magnet rotor, a stator winding and electronic circuit means for inducing voltages in the stator winding in dependence upon the changing position of the rotor to produce a rotating stator field, the arrangement comprising monitoring means connected to the electronic circuit means for providing a first signal varying in correspondence to the rotating stator field, and signal conversion means connected to said monitoring means for converting said first signal into said clock frequency signal synchronized to the speed of rotation of the rotor, said clock frequency signal alternately assuming one of two values, the time of transisition between said values being negligible.

2. The arrangement of claim 1 wherein the stator winding includes component windings and wherein the electronic circuit means induces emf voltages in the component windings respectively for producing the rotating stator field, said monitoring means comprising signal transmission circuits connected to the component windings respectively, said conversion means comprising comparators for converting said first signals into respective second signals of rectangular waveform, said comparators being connected to corresponding ones of the component windings through respective ones of said transmission circuits, and an exclusive-OR circuit having a plurality of inputs receiving said second signals respectively for forming therefrom said periodic waveform synchronized to the speed of rotation of the rotor.

3. The arrangement of claim 3, each of said signal transmission circuits containing a diode for coupling out the corresponding emf voltage.

4. Arrangement for generating a clock frequency signal for recording digital information on a data carrier such as a magnetic tape or the like driven by a brushless direct-current drive motor having a permanent magnet rotor, a stator winding and electronic circuit means for inducing voltages in the stator winding in dependence upon the changing position of the rotor to produce a rotating stator field, the electronic circuit means including detectors disposed in the field of the permanent magnet rotor for providing respective first signals indicative of the changing position of the rotor, the arrangement comprising monitoring means connected to the electronic circuit means for providing a first signal varying in correspondence to the rotating stator field, said monitoring means including signal transmission circuits connected to the outputs of respective ones of the detectors; and signal conversion means connected to said monitoring means for converting said first signal into a periodic waveform synchronized to the speed of rotation of the rotor, said waveform alternately assuming one of two values, the time of transition between said values being negligible, said signal conversion means including comparators for converting said first signals into respective second signals of rectangular waveform, said comparators being connected to corresponding ones of the detectors through respective ones of said transmission circuits, and an exclusive-OR circuit having a plurality of inputs receiving said second signals respectively for forming therefrom said periodic waveform synchronized to the speed of rotation of the rotor.

* * * * *